US011144511B1

(12) United States Patent
Chu et al.

(10) Patent No.: US 11,144,511 B1
(45) Date of Patent: *Oct. 12, 2021

(54) SHARE REPLICATION BETWEEN REMOTE DEPLOYMENTS

(71) Applicant: SNOWFLAKE INC., San Mateo, CA (US)

(72) Inventors: Pui Kei Johnston Chu, San Mateo, CA (US); Benoit Dageville, Foster City, CA (US); Shreyas Narendra Desai, Bellevue, WA (US); German Alberto Gil Echeverri, San Francisco, CA (US); Prasanna Krishnan, Palo Alto, CA (US); Vishnu Dutt Paladugu, Seattle, WA (US); Bowen Zhang, Newark, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/193,192

(22) Filed: Mar. 5, 2021

Related U.S. Application Data

(63) Continuation of application No. 16/900,840, filed on Jun. 12, 2020, now Pat. No. 10,949,402.
(Continued)

(51) Int. Cl.
*G06F 16/182* (2019.01)
*G06F 16/11* (2019.01)
(Continued)

(52) U.S. Cl.
CPC .......... *G06F 16/1844* (2019.01); *G06F 9/546* (2013.01); *G06F 16/128* (2019.01); *G06F 16/1734* (2019.01); *G06F 16/1827* (2019.01)

(58) Field of Classification Search
None
See application file for complete search history.

(56) References Cited

U.S. PATENT DOCUMENTS

| 5,870,765 A | 2/1999 | Bauer et al. |
| 6,044,374 A | 3/2000 | Nesamoney Diaz et al. |

(Continued)

OTHER PUBLICATIONS

M. Ezziyyani et al., "Security Techniques and Specifications for the Resources Protection in Mediation Systems", IEEE MELECON 2009, May 16-19, Benalmadena (Maiga), Spain. 4 pages.
(Continued)

*Primary Examiner* — Uyen T Le
(74) *Attorney, Agent, or Firm* — Womble Bond Dickinson (US) LLP

(57) ABSTRACT

Provided herein are systems and methods for an efficient method of replicating share objects to remote deployments. For example, the method may comprise modifying a share object of a first account of a data exchange into a global object wherein the share object includes grant metadata indicating share grants to a set of objects of a database. The method may further comprise creating, in a second account of the data exchange, a local replica of the share object on the remote deployment based on the global object, wherein the second account is located in a remote deployment. The set of objects of the database may be replicated to a local database replica on the remote deployment and the share grants may be replicated to the local replica of the share object.

20 Claims, 10 Drawing Sheets

Related U.S. Application Data

(60) Provisional application No. 63/030,267, filed on May 26, 2020.

(51) Int. Cl.
*G06F 9/54* (2006.01)
*G06F 16/17* (2019.01)

(56) References Cited

U.S. PATENT DOCUMENTS

| | | | |
|---|---|---|---|
| 7,890,463 | B2 | 2/2011 | Romem |
| 8,752,138 | B1 | 6/2014 | Bennett |
| 10,154,091 | B1 | 12/2018 | Flaherty et al. |
| 2005/0071195 | A1 | 3/2005 | Cassel et al. |
| 2009/0275354 | A1 | 11/2009 | Bulmer |
| 2011/0072206 | A1 | 3/2011 | Ross et al. |
| 2012/0240110 | A1 | 9/2012 | Breitgand et al. |
| 2013/0057384 | A1 | 3/2013 | Bolton |
| 2013/0279283 | A1 | 10/2013 | Seo et al. |
| 2014/0066013 | A1* | 3/2014 | Mascarenhas .... H04W 72/0493 455/411 |
| 2014/0173702 | A1* | 6/2014 | Wong ..................... H04L 63/10 726/4 |
| 2014/0266688 | A1 | 9/2014 | Hruska et al. |
| 2015/0324388 | A1 | 11/2015 | Benke et al. |
| 2017/0041296 | A1 | 2/2017 | Ford et al. |
| 2017/0200122 | A1* | 7/2017 | Edson .................. H04L 63/104 |
| 2020/0012659 | A1 | 1/2020 | Dageville et al. |
| 2020/0301943 | A1 | 9/2020 | Robinson et al. |
| 2021/0081378 | A1* | 3/2021 | Hu ........................ G06F 16/212 |
| 2021/0240690 | A1* | 8/2021 | Cseri ................... G06F 16/1865 |

OTHER PUBLICATIONS

Lindsay et al. "Build a distributed environment for Windows 10 deployment." Microsoft. Mar. 4, 2020 (Mar. 4, 2020) Retrieved on Jun. 20, 2021 (Jun. 20, 2021) from <https://docs.microsoft.com/en-us/windows/deployment/deploy-windows-mdt/build-a-distributed-environment-for-windows-10-deployment> entire document.
International Searching Authority, International Search Report dated Jul. 22, 2021, for International application No. PCT/US2021/029474.

* cited by examiner

SHARE REPLICATION BETWEEN REMOTE DEPLOYMENTS

PRIORITY CLAIM

This application is a continuation of application Ser. No. 16/900,840, filed on Jun. 12, 2020 and entitled "SHARE REPLICATION BETWEEN REMOTE DEPLOYMENTS," which claims the benefit of provisional patent application No. 63/030,267, filed on May 26, 2020, the disclosure of which is incorporated herein by reference.

TECHNICAL FIELD

The present disclosure relates to data sharing platforms, and particularly to sharing data between remote deployments thereof.

BACKGROUND

Databases are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
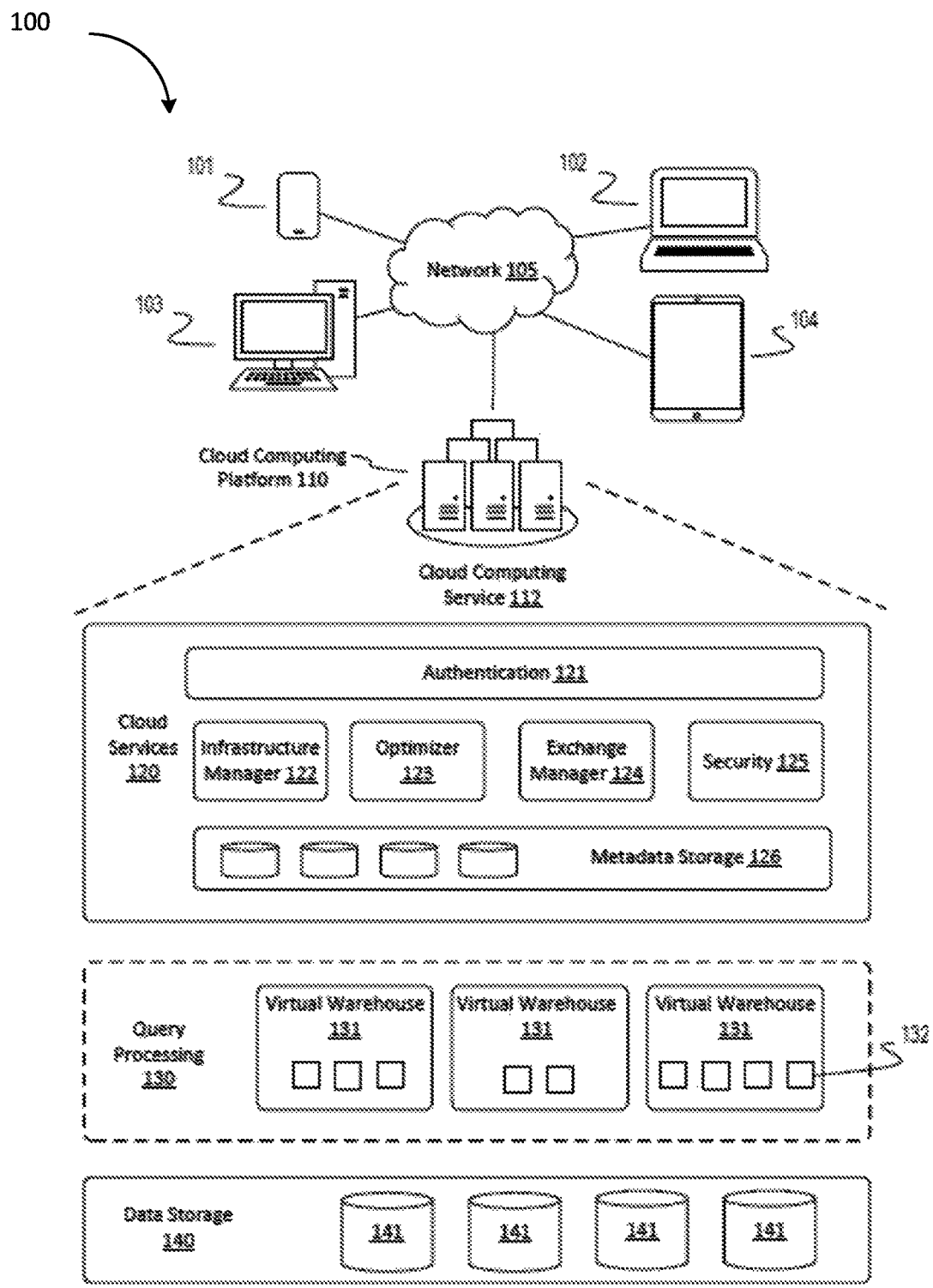
FIG. 1A is a block diagram depicting an example computing environment in which the methods disclosed herein may be implemented.

Data providers often have data assets that are cumbersome to share. A data asset may be data that is of interest to another entity. For example, a large online retail company may have a data set that includes the purchasing habits of millions of customers over the last ten years. This data set may be large. If the online retailer wishes to share all or a portion of this data with another entity, the online retailer may need to use old and slow methods to transfer the data, such as a file-transfer-protocol (FTP), or even copying the data onto physical media and mailing the physical media to the other entity. This has several disadvantages. First, it is slow. Copying terabytes or petabytes of data can take days. Second, once the data is delivered, the sharer cannot control what happens to the data. The recipient can alter the data, make copies, or share it with other parties. Third, the only entities that would be interested in accessing such a large data set in such a manner are large corporations that can afford the complex logistics of transferring and processing the data as well as the high price of such a cumbersome data transfer. Thus, smaller entities (e.g., "mom and pop" shops) or even smaller, more nimble cloud-focused startups are often priced out of accessing this data, even though the data may be valuable to their businesses. This may be because raw data assets are generally too unpolished and full of potentially sensitive data to just outright sell to other companies. Data cleaning, de-identification, aggregation, joining, and other forms of data enrichment need to be performed by the owner of data before it is shareable with another party. This is time-consuming and expensive. Finally, it is difficult to share data assets with many entities because traditional data sharing methods do not allow scalable sharing for the reasons mentioned above. Traditional sharing methods also introduce latency and delays in terms of all parties having access to the most recently-updated data.

Private and public data exchanges may allow data providers to more easily and securely share their data assets with other entities. A public data exchange (also referred to herein as a "Snowflake data marketplace," or a "data marketplace") may provide a centralized repository with open access where a data provider may publish and control live and read-only data sets to thousands of customers. A private data exchange (also referred to herein as a "data exchange") may be under the data provider's brand, and the data provider may control who can gain access to it. The data exchange may be for internal use only, or may also be opened to customers, partners, suppliers, or others. The data provider may control what data assets are listed as well as control who has access to which sets of data. This allows for a seamless way to discover and share data both within a data provider's organization and with its business partners.

The data exchange may be facilitated by a cloud computing service such as SNOWFLAKE™, and allows data providers to offer data assets directly from their own online domain (e.g., website) in a private online marketplace with their own branding. The data exchange may provide a centralized, managed hub for an entity to list internally or externally-shared data assets, inspire data collaboration, and also to maintain data governance and to audit access. With the data exchange, data providers may be able to share data without copying it between companies. Data providers may invite other entities to view their data listings, control which data listings appear in their private online marketplace, control who can access data listings and how others can interact with the data assets connected to the listings. This may be thought of as a "walled garden" marketplace, in which visitors to the garden must be approved and access to certain listings may be limited.

As an example, Company A may be a consumer data company that has collected and analyzed the consumption habits of millions of individuals in several different categories. Their data sets may include data in the following categories: online shopping, video streaming, electricity consumption, automobile usage, internet usage, clothing purchases, mobile application purchases, club memberships, and online subscription services. Company A may desire to offer these data sets (or subsets or derived products of these data sets) to other entities. For example, a new clothing brand may wish to access data sets related to consumer clothing purchases and online shopping habits. Company A may support a page on its website that is or functions substantially similar to a data exchange, where a data consumer (e.g., the new clothing brand) may browse, explore, discover, access and potentially purchase data sets directly from Company A. Further, Company A may control: who can enter the data exchange, the entities that may view a particular listing, the actions that an entity may take with respect to a listing (e.g., view only), and any other suitable action. In addition, a data provider may combine its own data with other data sets from, e.g., a public data exchange (also referred to as a "Snowflake data marketplace," or a "data marketplace"), and create new listings using the combined data.

A data exchange may be an appropriate place to discover, assemble, clean, and enrich data to make it more monetizable. A large company on a data exchange may assemble data from across its divisions and departments, which could become valuable to another company. In addition, participants in a private ecosystem data exchange may work together to join their datasets together to jointly create a useful data product that any one of them alone would not be able to produce. Once these joined datasets are created, they may be listed on the data exchange or on the data marketplace.

Sharing data may be performed when a data provider creates a share object (hereinafter referred to as a share) of a database in the data provider's account and grants the share access to particular objects (e.g., tables, secure views, and secure user-defined functions (UDFs)) of the database. Then, a read-only database may be created using information provided in the share. Access to this database may be controlled by the data provider. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. When data is shared, no data is copied or transferred between users. Sharing is accomplished through the cloud computing services of a cloud computing service provider such as SNOWFLAKE™.

Data that is shared by a provider may be described by listings defined by the provider in a data exchange or in a data marketplace. The access controls, management, and governance of the listings may be similar for both a data marketplace and a data exchange. A listing may include metadata describing the shared data.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share).

In a data exchange, many requests for a listing originate from a remote deployment. To grant data access to the listing, the listing owner needs to have another account or a partner account in that remote deployment and create an identical share. That identical share needs to have the same privilege access to a database (freshly created or replicated) that needs to be identical to the database to which access is granted in the original share in the listing owner's deployment.

The process of recreating a share and maintaining across one or more remote deployments is both tedious and error-prone. A user needs to manually login to an account in each deployment and execute a set of operations to create a local share. The user must provide all of the grants on the original share to each of the local shares. If the original share has a large number of grants to various objects on a database that includes hundreds or thousands of objects, then the user would need to perform hundreds or thousands of operations to recreate the original share. Any edits to the shares such as adding accounts would similarly require doing a set of operations (e.g., ALTER operations) to each copy in every deployment.

The systems and methods described herein provide an efficient way to replicate share objects in a data exchange. For example, the method may comprise modifying a share object of a first account of a data exchange into a global object wherein the share object includes grant metadata indicating share grants to a set of objects of a database. The method may further comprise creating, in a second account of the data exchange, a local replica of the share object on the remote deployment based on the global object, wherein the second account is located in a remote deployment. The set of objects of the database may be replicated to a local database replica on the remote deployment and the share grants may be replicated to the local replica of the share object.

FIG. 1A is a block diagram of an example computing environment 100 in which the systems and methods disclosed herein may be implemented. In particular, a cloud computing platform 110 may be implemented, such as AMAZON WEB SERVICES™ (AWS), MICROSOFT AZURE™, GOOGLE CLOUD™, or the like. As known in the art, a cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g. data management and access) and analysis functions (e.g. SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as AMAZON S3 to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution within elastic clusters of virtual machines, referred to herein as virtual warehouses or data warehouses. Thus, query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to the user's needs. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times. For example, a data load which takes fifteen hours on a system with four nodes might take only two hours with thirty-two nodes.

Cloud services 120 may be a collection of services that coordinate activities across the cloud computing service 110. These services tie together all of the different components of the cloud computing service 110 in order to process user requests, from login to query dispatch. Cloud services 120 may operate on compute instances provisioned by the cloud computing service 110 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security 125 engine, and metadata storage 126.

Figure 1B:
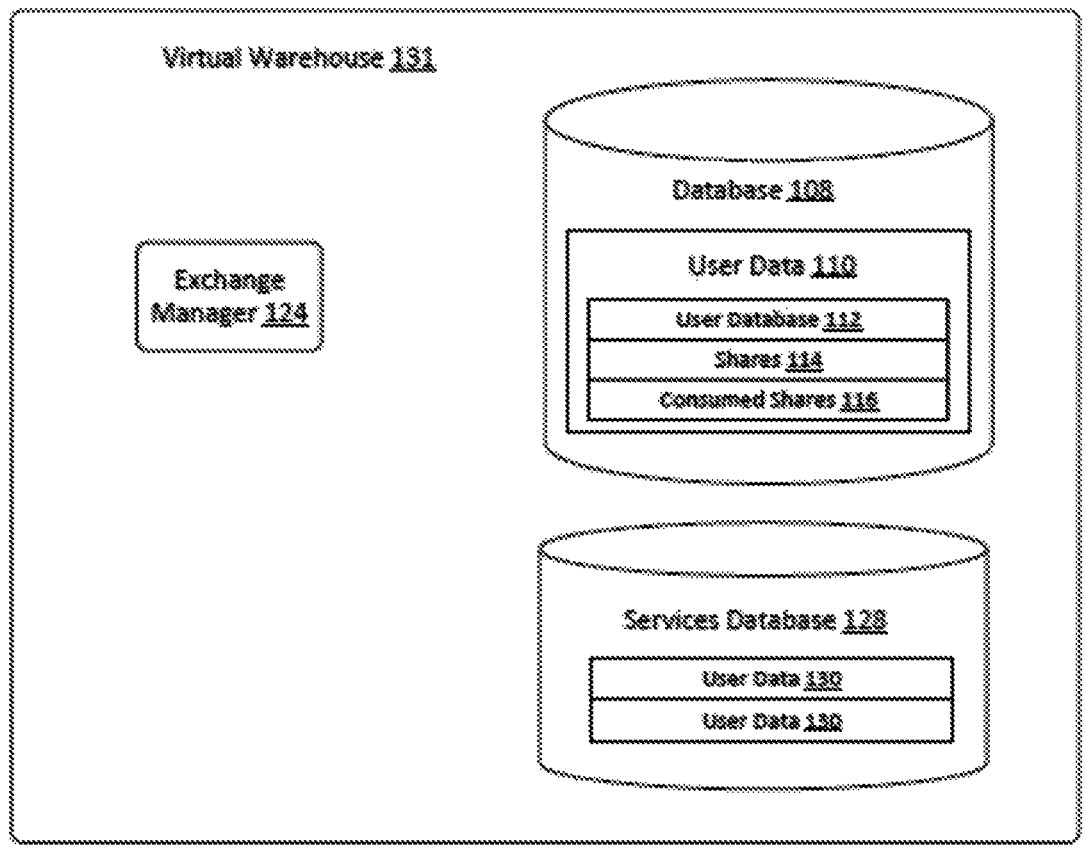
FIG. 1B is a block diagram illustrating an example virtual warehouse.

FIG. 1B is a block diagram illustrating an example virtual warehouse 131. The exchange manager 124 may facilitate the sharing of data between data providers and data consumers, using, for example, a data exchange. For example, cloud computing service 112 may manage the storage and access of a database 108. The database 108 may include various instances of user data 150 for different users, e.g. different enterprises or individuals. The user data may include a user database 152 of data stored and accessed by that user. The user database 152 may be subject to access controls such that only the owner of the data is allowed to change and access the database 112 upon authenticating with the cloud computing service 112. For example, data may be encrypted such that it can only be decrypted using decryption information possessed by the owner of the data. Using the exchange manager 124, specific data from a user database 152 that is subject to these access controls may be shared with other users in a controlled manner according to the methods disclosed herein. In particular, a user may specify shares 154 that may be shared in a public or data exchange in an uncontrolled manner or shared with specific other users in a controlled manner as described above. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. When data is shared, no data is copied or transferred between users. Sharing is accomplished through the cloud services 120 of cloud computing service 110.

Sharing data may be performed when a data provider creates a share of a database in the data provider's account and grants access to particular objects (e.g., tables, secure views, and secure user-defined functions (UDFs)). Then a read-only database may be created using information provided in the share. Access to this database may be controlled by the data provider.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share). A secure join may be performed as described in U.S. application Ser. No. 16/368,339, filed Mar. 18, 2019.

User devices 101-104, such as laptop computers, desktop computers, mobile phones, tablet computers, cloud-hosted computers, cloud-hosted serverless processes, or other computing processes or devices may be used to access the virtual warehouse 131 or cloud service 120 by way of a network 105, such as the Internet or a private network.

In the description below, actions are ascribed to users, particularly consumers and providers. Such actions shall be understood to be performed with respect to devices 101-104 operated by such users. For example, notification to a user may be understood to be a notification transmitted to devices 101-104, an input or instruction from a user may be understood to be received by way of the user's devices 101-104, and interaction with an interface by a user shall be understood to be interaction with the interface on the user's devices 101-104. In addition, database operations (joining, aggregating, analysis, etc.) ascribed to a user (consumer or provider) shall be understood to include performing of such actions by the cloud computing service 110 in response to an instruction from that user.

Figure 2:
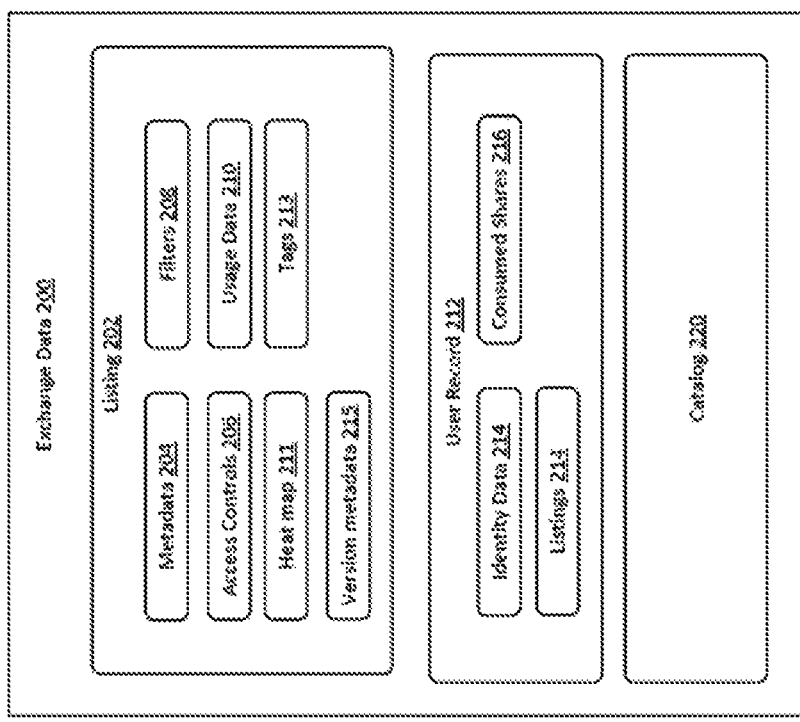
FIG. 2 is a schematic block diagram of data that may be used to implement a public or private data exchange in accordance with an embodiment of the present invention.

FIG. 2 is a schematic block diagram of data that may be used to implement a public or data exchange in accordance with an embodiment of the present invention. The exchange manager 124 may operate with respect to some or all of the illustrated exchange data 200, which may be stored on the platform executing the exchange manager 124 (e.g., the cloud computing platform 110) or at some other location. The exchange data 200 may include a plurality of listings 202 describing data that is shared by a first user ("the provider"). The listings 202 may be listings in a data exchange or in a data marketplace. The access controls, management, and governance of the listings may be similar for both a data marketplace and a data exchange.

A listing 202 may include metadata 204 describing the shared data. The metadata 204 may include some or all of the following information: an identifier of the sharer of the shared data, a URL associated with the sharer, a name of the share, a name of tables, a category to which the shared data belongs, an update frequency of the shared data, a catalog of the tables, a number of columns and a number of rows in each table, as well as name for the columns. The metadata 204 may also include examples to aid a user in using the data. Such examples may include sample tables that include a sample of rows and columns of an example table, example queries that may be run against the tables, example views of an example table, example visualizations (e.g., graphs, dashboards) based on a table's data. Other information included in the metadata 204 may be metadata for use by business intelligence tools, text description of data contained in the table, keywords associated with the table to facilitate searching, a link (e.g., URL) to documentation related to the shared data, and a refresh interval indicating how frequently the shared data is updated along with the date the data was last updated.

The listing 202 may include access controls 206, which may be configurable to any suitable access configuration. For example, access controls 206 may indicate that the shared data is available to any member of the private exchange without restriction (an "any share" as used elsewhere herein). The access controls 206 may specify a class of users (members of a particular group or organization) that are allowed to access the data and/or see the listing. The access controls 206 may specify that a "point-to-point" share (see discussion of FIG. 4) in which users may request access but are only allowed access upon approval of the provider. The access controls 206 may specify a set of user identifiers of users that are excluded from being able to access the data referenced by the listing 202.

Figure 4:
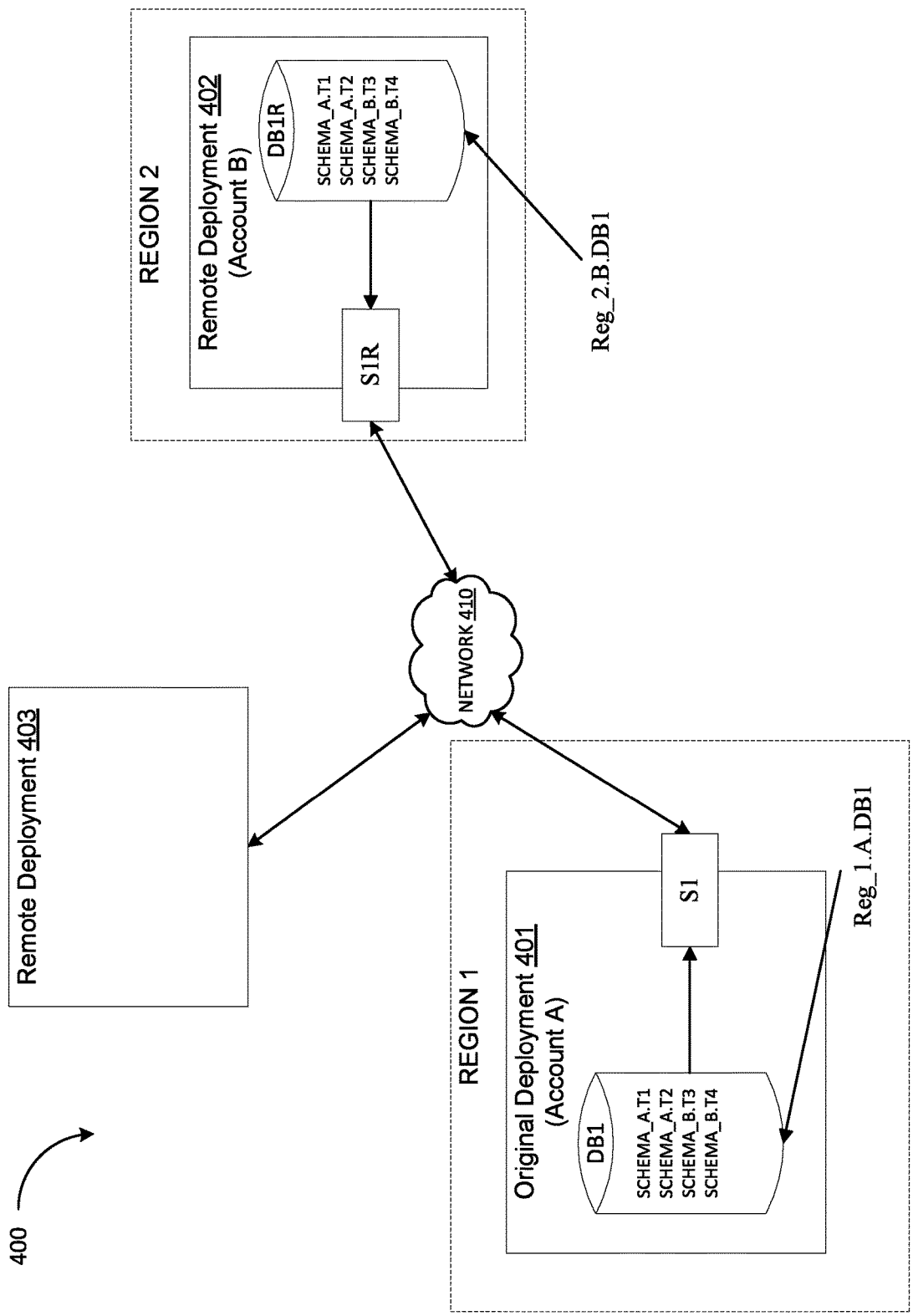
FIG. 4 is a block diagram of remote deployments in a data exchange, in accordance with some embodiments of the present invention.

Note that some listings 202 may be discoverable by users without further authentication or access permissions whereas actual accesses are only permitted after a subsequent authentication step (see discussion of FIGS. 4 and 6). The access controls 206 may specify that a listing 202 is only discoverable by specific users or classes of users.

Note also that a default function for listings 202 is that the data referenced by the share is not exportable by the consumer. Alternatively, the access controls 206 may specify that this not permitted. For example, access controls 206 may specify that secure operations (secure joins and secure functions as discussed below) may be performed with respect to the shared data such that viewing and exporting of the shared data is not permitted.

In some embodiments, once a user is authenticated with respect to a listing 202, a reference to that user (e.g., user identifier of the user's account with the virtual warehouse 131) is added to the access controls 206 such that the user will subsequently be able to access the data referenced by the listing 202 without further authentication.

The listing 202 may define one or more filters 208. For example, the filters 208 may define specific user identifiers 214 of users that may view references to the listing 202 when browsing the catalog 220. The filters 208 may define a class of users (users of a certain profession, users associated with a particular company or organization, users within a particular geographical area or country) that may view references to the listing 202 when browsing the catalog 220. In this manner, a private exchange may be implemented by the exchange manager 124 using the same components. In some embodiments, an excluded user that is excluded from accessing a listing 202, i.e. adding the listing 202 to the consumed shares 156 of the excluded user, may still be permitted to view a representation of the listing when browsing the catalog 220 and may further be permitted to request access to the listing 202 as discussed below. Requests to access a listing by such excluded users and other users may be listed in an interface presented to the provider of the listing 202. The provider of the listing 202 may then view demand for access to the listing and choose to expand the filters 208 to permit access to excluded users or classes of excluded users (e.g., users in excluded geographic regions or countries).

Filters 208 may further define what data may be viewed by a user. In particular, filters 208 may indicate that a user that selects a listing 202 to add to the consumed shares 156 of the user is permitted to access the data referenced by the listing but only a filtered version that only includes data associated with the identifier 214 of that user, associated with that user's organization, or specific to some other classification of the user. In some embodiments, a private exchange is by invitation: users invited by a provider to view listings 202 of a private exchange are enabled to do by the exchange manager 124 upon communicating acceptance of an invitation received from the provider.

In some embodiments, a listing 202 may be addressed to a single user. Accordingly, a reference to the listing 202 may be added to a set of "pending shares" that is viewable by the user. The listing 202 may then be added to a group of shares of the user upon the user communicating approval to the exchange manager 124.

The listing 202 may further include usage data 210. For example, the cloud computing service 112 may implement a credit system in which credits are purchased by a user and are consumed each time a user runs a query, stores data, or uses other services implemented by the cloud computing service 112. Accordingly, usage data 210 may record an amount of credits consumed by accessing the shared data. Usage data 210 may include other data such as a number of queries, a number of aggregations of each type of a plurality of types performed against the shared data, or other usage statistics. In some embodiments, usage data for a listing 202 or multiple listings 202 of a user is provided to the user in the form of a shared database, i.e. a reference to a database including the usage data is added by the exchange manager 124 to the consumed shares of the user.

The listing 202 may also include a heat map 211, which may represent the geographical locations in which users have clicked on that particular listing. The cloud computing service 110 may use the heat map to make replication decisions or other decisions with the listing. For example, a data exchange may display a listing that contains weather data for Georgia, USA. The heat map 211 may indicate that many users in California are selecting the listing to learn more about the weather in Georgia. In view of this information, the cloud computing service 110 may replicate the listing and make it available in a database whose servers are physically located in the western United States, so that consumers in California may have access to the data. In some embodiments, an entity may store its data on servers located in the western United States. A particular listing may be very popular to consumers. The cloud computing service 110 may replicate that data and store it in servers located in the eastern United States, so that consumers in the Midwest and on the East Coast may also have access to that data.

The listing 202 may also include one or more tags 213. The tags 213 may facilitate simpler sharing of data contained in one or more listings. As an example, a large company may have a human resources (HR) listing containing HR data for its internal employees on a data exchange. The HR data may contain ten types of HR data (e.g., employee number, selected health insurance, current retirement plan, job title, etc.). The HR listing may be accessible to 100 people in the company (e.g., everyone in the HR department). Management of the HR department may wish to add an eleventh type of HR data (e.g., an employee stock option plan). Instead of manually adding this to the HR listing and granting each of the 100 people access to this new data, management may simply apply an HR tag to the new data set and that can be used to categorize the data as HR data, list it along with the HR listing, and grant access to the 100 people to view the new data set.

The listing 202 may also include version metadata 215. Version metadata 215 may provide a way to track how the datasets are changed. This may assist in ensuring that the data that is being viewed by one entity is not changed prematurely. For example, if a company has an original data set and then releases an updated version of that data set, the updates could interfere with another user's processing of that data set, because the update could have different formatting, new columns, and other changes that may be incompatible with the current processing mechanism of the recipient user. To remedy this, the cloud computing service 112 may track version updates using version metadata 215. The cloud computing service 112 may ensure that each data consumer accesses the same version of the data until they accept an updated version that will not interfere with current processing of the data set.

The exchange data 200 may further include user records 212. The user record 212 may include data identifying the user associated with the user record 212, e.g. an identifier (e.g., warehouse identifier) of a user having user data 150 in service database 128 and managed by the virtual warehouse 131.

The user record 212 may list shares associated with the user, e.g., reference listings 202 created by the user. The user record 212 may list shares consumed by the user, e.g. reference listings 202 created by another user and that have been associated to the account of the user according to the methods described herein. For example, a listing 202 may have an identifier that will be used to reference it in the shares or consumed shares of a user record 212.

The exchange data 200 may further include a catalog 220. The catalog 220 may include a listing of all available listings 202 and may include an index of data from the metadata 204 to facilitate browsing and searching according to the methods described herein. In some embodiments, listings 202 are stored in the catalog in the form of JavaScript Object Notation (JSON) objects.

Note that where there a multiple instances of the virtual warehouse 131 on different cloud computing platforms, the catalog 220 of one instance of the virtual warehouse 131 may store listings or references to listings from other instances on one or more other cloud computing platforms 110. Accordingly, each listing 202 may be globally unique (e.g., be assigned a globally unique identifier across all of the instances of the virtual warehouse 131). For example, the instances of the virtual warehouses 131 may synchronize their copies of the catalog 220 such that each copy indicates the listings 202 available from all instances of the virtual warehouse 131. In some instances, a provider of a listing 202 may specify that it is to be available on only on specified on or more computing platforms 110.

In some embodiments, the catalog 220 is made available on the Internet such that it is searchable by a search engine such as BING or GOOGLE. The catalog may be subject to a search engine optimization (SEO) algorithm to promote its visibility. Potential consumers may therefore browse the catalog 220 from any web browser. The exchange manager 124 may expose uniform resource locators (URLs) linked to each listing 202. This URL may be searchable can be shared outside of any interface implemented by the exchange manager 124. For example, the provider of a listing 202 may publish the URLs for its listings 202 in order to promote usage of its listing 202 and its brand.

Figure 3:
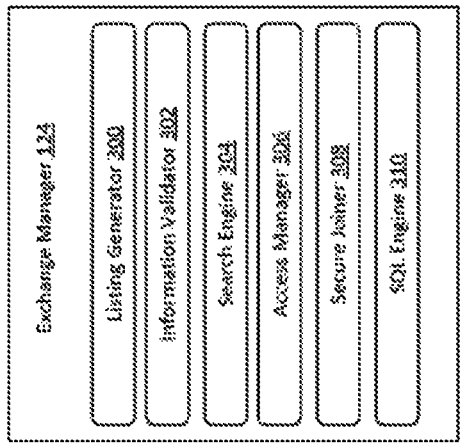
FIG. 3 is a schematic block diagram of components for implementing a data exchange in accordance with an embodiment of the present invention.

FIG. 3 illustrates various components 300-310 that may be included in the exchange manager 124. A creation module 300 may provide an interface for creating listings 202. For example, a webpage interface to the virtual warehouse 131 that enables a user on a device 101-104 to select data, e.g. a specific table in user data 150 of the user, for sharing and enter values defining some or all of the metadata 204, access controls 206, and filters 208. In some embodiments, creation may be performed by a user by way of SQL commands in an SQL interpreter executing on the cloud computing platform 110 and accessed by way of a webpage interface on a user device 101-104.

A validation module 302 may validate information provided by a provider when attempting to create a listing 202. Note that in some embodiments the actions ascribed to the validation module 302 may be performed by a human reviewing the information provided by the provider. In other embodiments, these actions are performed automatically. The validation module 302 may perform, or facilitate performing by a human operator of various functions. These functions may include verifying that the metadata 204 is consistent with the shared data to which it references, verifying that the shared data referenced by metadata 204 is not pirated data, personal identification information (PII), personal health information (PHI) or other data from which sharing is undesirable or illegal. The validation module 302 may also facilitate the verification that the data has been updated within a threshold period of time (e.g., within the last twenty-four hours). The validation module 302 may also facilitate verifying that the data is not static or not available from other static public sources. The validation module 302 may also facilitate verifying that the data is more than merely a sample (e.g., that the data is sufficiently complete to be useful). For example, geographically limited data may be undesirable whereas an aggregation of data that is not otherwise limited may still be of use.

The exchange manager 124 may include a search module 304. The search module 304 may implement a webpage interface that is accessible by a user on user devices 101-104 in order to invoke searches for search strings with respect to the metadata in the catalog 220, receive responses to searches, and select references to listings 202 in search results for adding to the consumed shares 156 of the user record 212 of the user performing the search. In some embodiments, searches may be performed by a user by way of SQL commands in an SQL interpreter executing on the cloud computing platform 102 and accessed by way of a webpage interface on user devices 101-104. For example, searching for shares may be performed by way of SQL queries against the catalog 220 within the SQL engine 310 discussed below.

The search module 304 may further implement a recommendation algorithm. For example, the recommendation algorithm could recommend other listing 202 for a user based on other listings in the user's consumed shares 156 or formerly in the user's consumed shares. Recommendations could be based on logical similarity: one source of weather data leads to a recommendation for a second source of weather data. Recommendations could be based on dissimilarity: one listing is for data in one domain (geographic area, technical field, etc.) results in a listing for a different domain to facilitate complete coverage by the user's analysis (different geographic area, related technical field, etc.).

The exchange manager 124 may include an access management module 306. As described above, a user may add a listing 202. This may require authentication with respect to the provider of the listing 202. Once a listing 202 is added to the consumed shares 156 of the user record 212 of a user, the user may be either (a) required to authenticate each time the data referenced by the listing 202 is accessed or (b) be automatically authenticated and allowed to access the data once the listing 202 is added. The access management module 306 may manage automatic authentication for subsequent access of data in the consumed shares 156 of a user in order to provide seamless access of the shared data as if it was part of the user data 150 of that user. To that end, the access management module 306 may access controls 206 of the listing 202, certificates, tokens, or other authentication material in order to authenticate the user when performing accesses to shared data.

The exchange manager 124 may include a joining module 308. The joining module 308 manages the integration of shared data referenced by consumed shares 156 of a user with one another, i.e. shared data from different providers, and with a user database 152 of data owned by the user. In particular, the joining module 308 may manage the execution of queries and other computation functions with respect to these various sources of data such that their access is transparent to the user. The joining module 308 may further manage the access of data to enforce restrictions on shared data, e.g. such that analysis may be performed and the results of the analysis displayed without exposing the underlying data to the consumer of the data where this restriction is indicated by the access controls 206 of a listing 202.

The exchange manager 124 may further include a standard query language (SQL) engine 310 that is programmed to receive queries from a user and execute the query with respect to data referenced by the query, which may include consumed shares 156 of the user and the user data 112 owned by the user. The SQL engine 310 may perform any query processing functionality known in the art. The SQL engine 310 may additionally or alternatively include any other database management tool or data analysis tool known in the art. The SQL engine 310 may define a webpage interface executing on the cloud computing platform 102 through which SQL queries are input and responses to SQL queries are presented.

FIG. 4 illustrates a cloud environment 400 comprising multiple remote cloud deployments 401, 402, and 403. Each of the remote deployments 401, 402, and 403 may comprise a similar architecture to cloud computing service 112 (illustrated in FIG. 1A). The remote deployments 401, 402, and 403 may all be physically located in separate remote geographical regions (hence the term "remote deployment") but may all be deployments of a single data exchange or data marketplace. In cloud environment 400, requests for a listing on remote deployment 401 may originate from an account on remote deployment 402. To grant data access to the listing, the listing owner needs to have another account or a partner account in remote deployment 402 and create an identical share. That identical share needs to have the same privilege access to a database (freshly created or replicated) that needs to be identical to the database which is granted to the original share in the listing owner's deployment.

Although embodiments of the present disclosure are described with respect to a data exchange for ease of description, the systems and methods for share replication described herein do not need to be coupled to a data exchange. For example, remote deployments 401-403 may each include user accounts and databases in a stand-alone setting.

As discussed above, the process of recreating a share and maintaining it is both tedious and error-prone. A user needs to manually login to an account in each deployment and execute a large set of operations to create a local share and provide grants from the original share to the local share. Any edits to the local shares such as adding tables would similarly require doing a set of ALTER operations to each copy in every deployment.

Existing mechanisms for database replication do not require performance of such extensive operation sets. For example, if account A resides on remote deployment 401 located in region 1 and has a database DB1 on remote deployment 401 that he wants to share with account B residing within remote deployment 402 located in region 2, account A may alter the database DB1 such that it becomes a global type database (as opposed to region specific) and replicate the metadata of DB1 to the remote deployment 402 (e.g., by using the command "alter database DB1 enable replication to accounts Reg_2.B"). Account B may obtain a list of databases for which they have access to (e.g., using a command "show replication databases") which will return the identifier "Reg_1.A.DB1 (primary)" indicating DB1. Account B may create a local replica of DB1 (shown in FIG. 4 as DB1R) on remote deployment 402 (e.g., by using the command "create database DB1R as replica of Reg_1.A.DB1"), which creates a global type database, because it was created as a replica. It should be noted that as of now, no data replication has started yet. At this point, the command "show replication databases" will return the identifiers "Reg_1.A.DB1 (primary)" and "Reg_2.B.DB1 (secondary)." Account B may initiate the data replication by using a command (e.g., "alter database DB1 refresh") which is a synchronous operation whose duration may depend on the amount of data to synchronize.

Embodiments of the present disclosure may mimic aspects of the database replication process described above to enable share replication that does not require manually creating a local share in every deployment and manually providing all of the grants on the original share S1 to each of the local shares. For example, account A (which resides in remote deployment 401 located in region 1) has a share object S1 that has been granted certain privileges ("share grants" or, "grants") to database DB1. For example, S1 may have usage and select grants that allow access to and usage of DB1, as well as the schemas, tables, views, functions, and formats etc. within DB1. The share grants on S1 may be stored in the form of grant metadata. The remote deployment 401 may utilize any appropriate metadata store such as FoundationDB, for example, to store the grant metadata of S1 as well as share metadata of S1 and database metadata of DB1. If account A wants to replicate S1 to account B (which resides in remote deployment 402 located in region 2), account A may alter S1 to be a global object and replicate S1 to the remote deployment 402 (e.g., using the command "alter share S1 enable replication to accounts Reg_2.B"). More specifically, remote deployment 401 may modify S1, which is an object specific to region 1, to include a global representation that is present in region 2. Remote deployment 401 may set the authorization properties of S1 to store a list of global accounts that are enabled to create a local replica of S1 and include in the list account B. S1 may include an existing "primaryOn" field which may be set to the timestamp value of when account A alters S1 to be a global object and replicates S1 to the remote deployment 402. In this way, remote deployment 401 may identify S1 as a primary and distinguish it from any secondary replicas. Account B may obtain a list of share objects owned by him/herself or others in the same replication group for which access is enabled (e.g., using the command "show replication shares"), and the list may include an identifier for S1 ("Reg_1.A.S1 (primary)"). In some embodiments, S1 may not need to be the primary and any replica object created therefrom may be designated as the primary.

Because a global representation of S1 is present in region 2, account B may then create a local replica of S1 (e.g., using the command "create share S1R as replica of Reg_1.A.S1 (primary)") which creates a global share object that is a replica of S1 (shown in FIG. 4 as S1R) with the "primaryOn" field set to "0" since it is a replica. A local replica of DB1 (DB1R) may be created on remote deployment 402 using the same process discussed hereinabove with respect to database replication, which creates DB1R as a global type database, because it was created as a replica of DB1 which has been made global. Account B may also obtain a list of databases for which access is enabled as discussed above. In some embodiments, account A may use a communication protocol such as SSH for example to establish a secure connection to account B via which account A may "remote login" to account B or start a remote execution context in account B to create the replica share object S1R and replica database DB1R. More specifically, a global identity may be created that is linked to (e.g., has access to) multiple accounts (in this case, account A and account B). Upon creation of this global identity, a user who logs into account A may establish the secure connection to account B via which account A may "remote login" to account B or start a remote execution context in account B. At this point, account A may initiate functions for creation of the replica share object S1R and replica database DB1R on remote deployment 401, and these functions may subsequently be executed in account B on remote deployment 402. S1R and DB1R may be replicated to any appropriate object, such as a dictionary object in the local metadata store (e.g., FoundationDB) of remote deployment 402.

It should be noted that at this point, no replication of share grants (e.g., the grant metadata) between S1 and the original database DB1 or the underlying data of the database DB1 (e.g., the underlying schemas, tables, views, functions, formats etc. of DB1) has occurred yet. To start replication of the share grants of S1, account B may initiate a share refresh operation (e.g., using the command "alter share S1R refresh"). The remote deployment 402 may send a refresh message (shown in FIG. 5 as "refresh S1R") to the remote deployment 401 which will replicate the necessary information to the remote deployment 402. More specifically, upon receipt of the refresh message, remote deployment 401 may replicate the grant metadata of S1 to S1R as discussed in further detail below with respect to FIG. 5. In addition, the database replication process discussed above may be automatically triggered, to initiate replication of the underlying data of DB1 (e.g., the underlying schemas, tables, views, functions, formats etc. of DB1) to DB1R in response to the share refresh message (e.g., may be part of the share refresh operation). In some embodiments, the database replication process is separate from the share refresh operation and is not automatically triggered by the refresh message and may be triggered by the user at their discretion. For example, the owner of account B may choose to trigger a share refresh as a downstream task from the database replication. In some embodiments, account A may use any appropriate communication protocol to "remote login" to account B or start a remote execution context in account B as discussed herein, and trigger a refresh operation.

Figure 5:
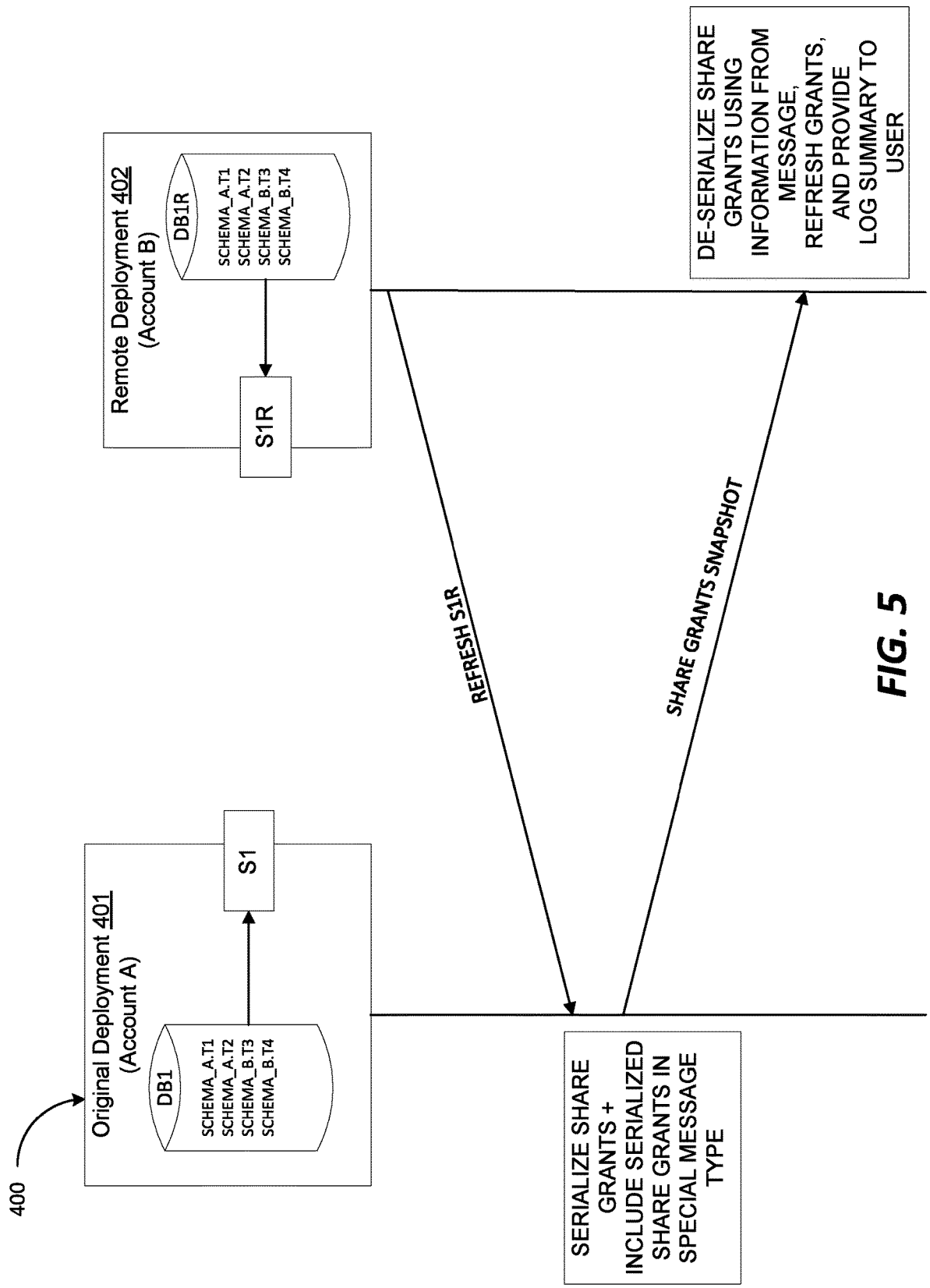
FIG. 5 is a diagram illustrating a share grant refresh, in accordance with some embodiments of the present invention.

FIG. 5 illustrates the replication of the share grants (e.g., grant metadata) of S1 to S1R (also referred to as a "share refresh operation"). In response to receiving the refresh message ("refresh S1R") from remote deployment 402, remote deployment 401 may retrieve all the share grants for S1, serialize all the share grants, and put the serialized share grants into a file and transmit a message including the file to the remote deployment 402. In some embodiments, the remote deployment 401 may leverage a global messaging framework and utilize a special message type (referred to herein as a "snapshot message") that specifically enables the share replication. For each global message type, there is a corresponding processing function that applies to processing messages of that type. Thus, a global message of a particular type will include custom logic for what processing needs to be done for that particular message type. The snapshot message type may include information to inform a deployment that the message includes grants and allow a remote deployment to properly deserialize the grants for the purposes of share replication. More specifically, the body of the message may comprise a global object reference for S1 and a list of modified grant objects representing the grants on DB1 and its underlying objects to S1. The global object reference may comprise a tuple of the original deployment ID (e.g., the ID of remote deployment 401) and the ID of the object to be replicated, which in this example is the ID of the share object S1. Each grant object may be an internal representation of a particular grant to S1 and may be associated to S1 to allow a consumer to use/select the underlying database objects defined by the grant. Each grant object may have several fields including: a global object reference of DB1 or one of its underlying objects that are granted to the share, an object type (e.g., securable type), a privilege/grant type (e.g., usage or select), and a timestamp of when the grant happened, for example.

Upon receiving the special message, the remote deployment 402 may deserialize the message and apply the share grants to S1R. As can be seen, a share refresh as described herein is based on a pull model (as opposed to a push model). Stated differently, S1R will update only when a share refresh is requested and there will be a discrepancy between S1R and S1 until a share refresh of S1R is performed.

In some embodiments, the database replication and share refresh operations may be separate, and the database replication may be managed by the owner of account B, for example. The owner of account B may have control over whether/when to initiate the database replication. A dedicated API may be used for executing the share refresh. In other embodiments, the database replication is hidden from the user, and is automatically performed as part of the share refresh. In either case, replication of the share grants (i.e. the share refresh operation) of share S1 is preceded by the database replication.

The user of account B in remote deployment 402 may initiate subsequent share refresh operations to update the share grants of S1 to S1R. Subsequent share refreshes may be initiated periodically, in response to modifications to the share grants on S1, at the owner of account B's discretion, or based on any other appropriate criteria. As discussed above, a share refresh operation essentially entails refreshing the share grants (also referred to as "grant metadata") on S1 (e.g., the grants to the tables, views, functions, formats etc. of DB1) to S1R. This requires prior replication of the underlying objects of DB1. Thus, when modifications to the share grants of S1 are made (e.g., in response to modifications to DB1), there may be situations where certain new share grants cannot be replicated to S1R during a share refresh because the underlying objects corresponding to those new share grants has not yet been replicated to DB1R.

Objects may be missing due to the time delay between database replication and share refresh, as well as inconsistent database replication and share refresh frequencies, for example. This may be particularly evident in scenarios where the share refresh and database replication operations are separate. In some embodiments, a partial share refresh may be executed if the database replication has not yet completed. For example, it may be important for a share refresh task to execute gracefully within a certain time frame, in which case the share refresh cannot wait for the database replication to complete. The share grants (e.g., grant metadata) for the objects of DB1 that are detected in DB1R at the time of the share refresh may be updated, and for objects in DB1R which are no longer in DB1, any grants to those objects in S1R may be revoked. For those objects of DB1 that were not located/are missing from DB1R at the time of the share refresh, or are included in DB1R but are no longer in DB1 at the time of the share refresh, a log may be created which indicates the objects of DB1 that are missing from/extra to DB1R and the updated share grants that could not be replicated so S1R or should be deleted from S1R.

In some embodiments, a share refresh task may follow an "all or nothing" approach. If there are one or more missing objects, no new grants will be applied. In these situations, a log may be created which indicates the database objects whose underlying data was not located, and for which updated grant metadata could not be replicated.

By applying share grants of share object S1 to a replica share object in a remote deployment, a user may avoid manually logging in to an account in each remote deployment they wish to replicate the share object S1 to and executing a large set of operations to create a local share and provide grants from the original share to the local share. In this way, a more resource efficient share replication method is provided.

Figure 6A:
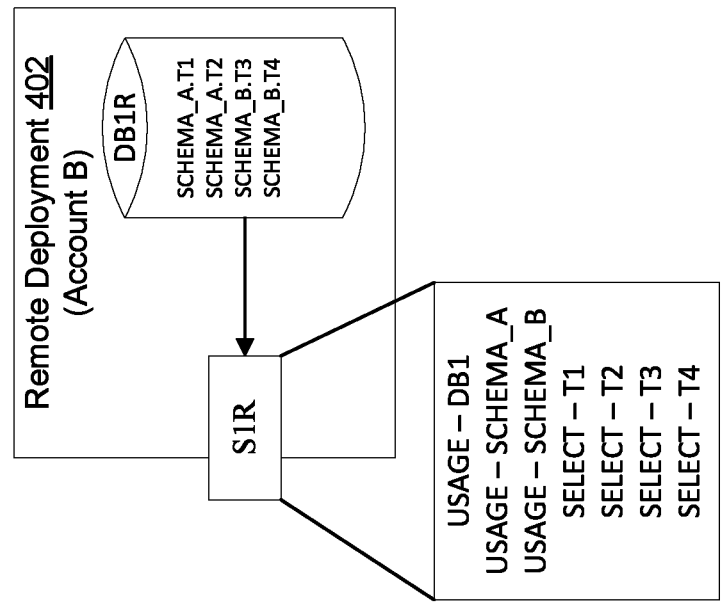
FIGS. 6A and 6B are diagrams illustrating a subsequent share grant refresh, in accordance with some embodiments of the present invention.
Figure 6A:
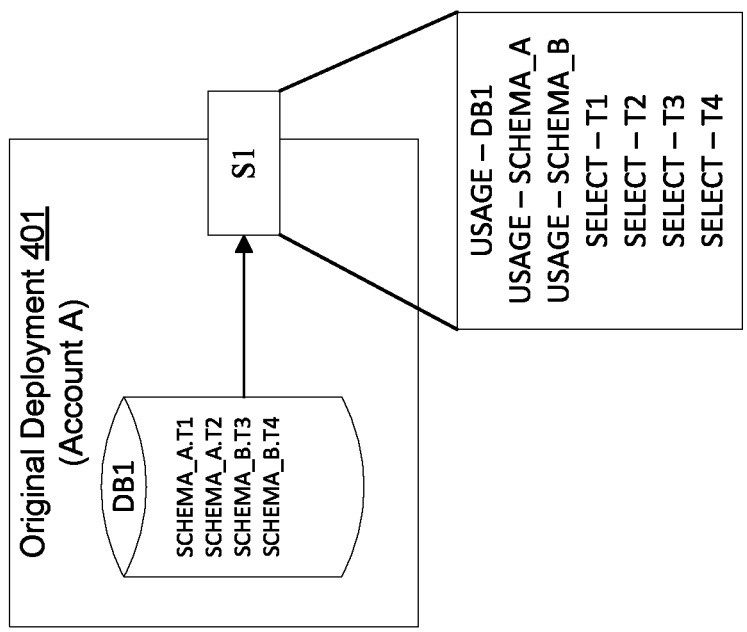

FIG. 6A illustrates S1 and S1R and their associated share grants after a share replication operation as discussed above with respect to FIGS. 4 and 5, in accordance with some embodiments of the present disclosure. FIG. 6A illustrates the accounts A and B and their associated databases and shares as well as the share grants applied to their associated shares. As shown in FIG. 6A, S1 has a usage grant on DB1, usage grants for schema A and B, and select grants for tables T1, T2, T3, and T4 in DB1. S1R has similar usage grants for DB1R after the share replication operation discussed herein.

Figure 6B:
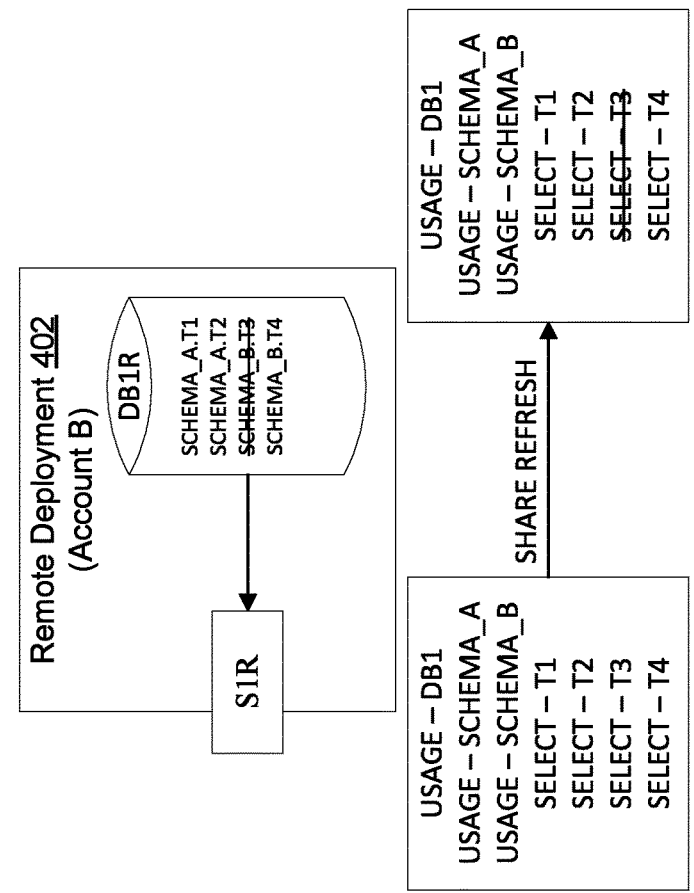
Figure 6B:
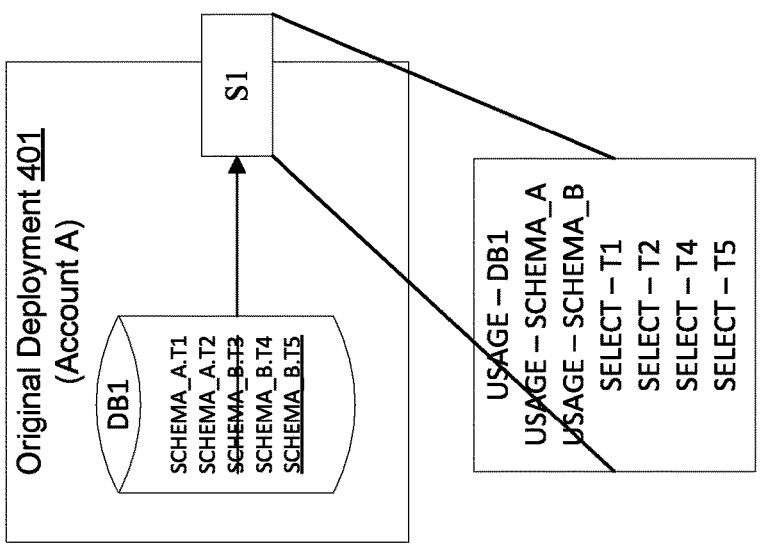

As shown in FIG. 6B, table T3 may subsequently be deleted from DB1 and table T5 may be added to DB1, and so the corresponding select grant for T3 no longer exists among the share grants of S1 while a select grant for T5 has been added to the share grants of S1. Account B may perform a subsequent share refresh operation and may trigger a subsequent database replication to replicate new table T5 to DB1R and delete T3 from DB1R. As discussed above, database replication may be triggered at the discretion of the owner of account B, or may automatically trigger upon initiation of a share refresh operation.

In the example of FIG. 6B, the share refresh operation may be required to execute gracefully within a certain time frame, and there may be a time delay between initiation of the share refresh and database replication operations. As a result, neither the deletion of T3 nor the addition of T5 has been replicated to DB1R when the share refresh commences. During the share refresh, remote deployment 402 may determine that T3 is within DB1R but not within DB1, and may thus revoke any grants to T3 from S1R. Remote deployment 402 may then examine the select grant for T5 and determine that object T5 has not yet been replicated to DB1R, and may thus add T5 and the select grant to T5 to a log to inform the owner of account B that they were not able to be replicated due to missing objects. The remote deployment 402 may also issue a notification/message to the owner of account B indicating that their database DB1R must be refreshed. In this way, the select grant on T5 may be replicated to S1R during a subsequent share refresh operation once table T5 is created during a database replication.

Figure 7:
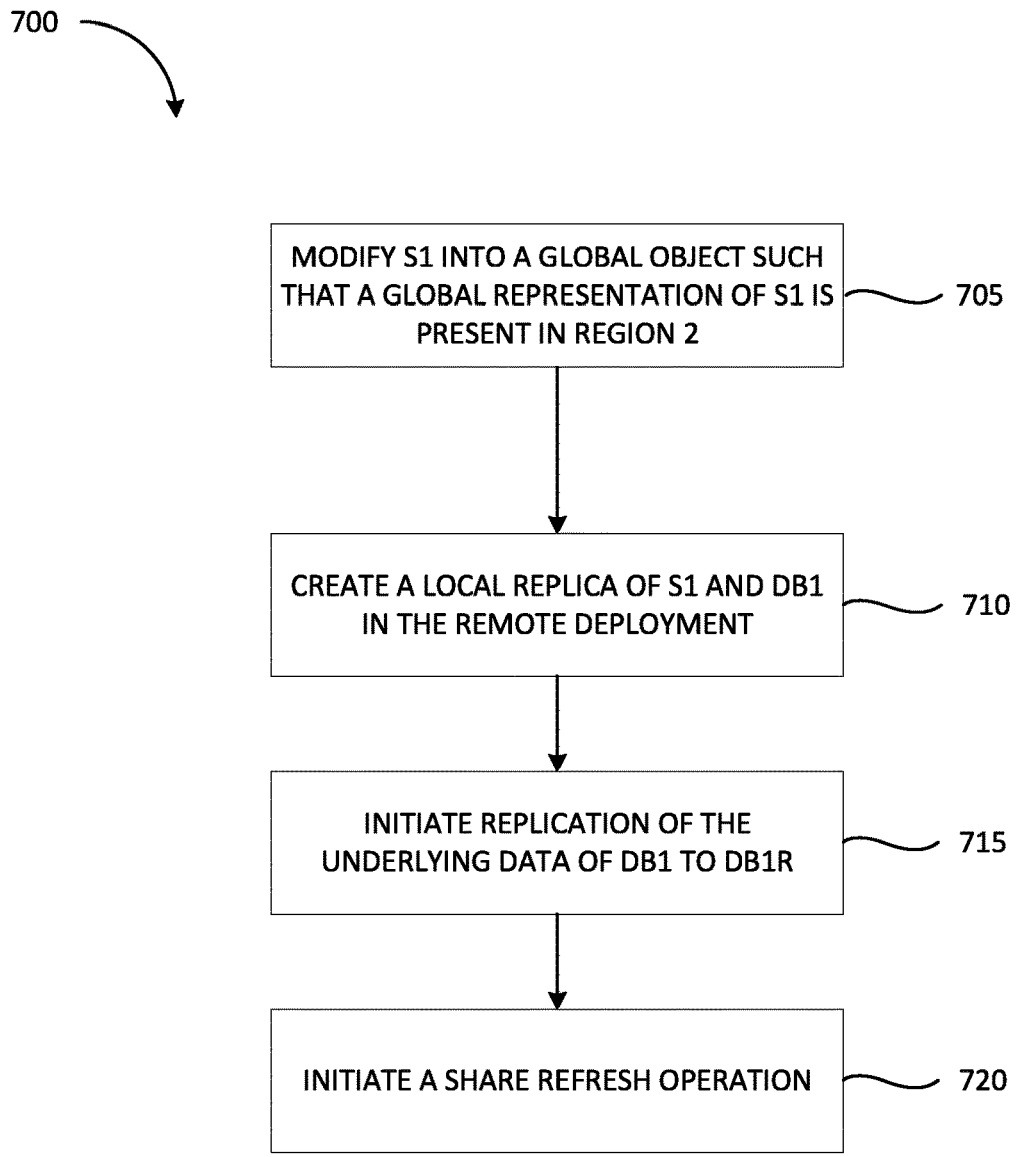
FIG. 7 is a flow diagram of a method for replicating a share object to a remote deployment, in accordance with some embodiments of the present invention.

FIG. 7 is a flow diagram of a method 700 replicating a share object to a remote deployment, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 700 may be performed by respective processing devices of remote deployments 401 and 402 (illustrated in FIGS. 4 and 5).

Referring simultaneously to FIG. 4, if account A wants to replicate S1 to account B in remote deployment 402 in region 2, then account A may alter S1 to be a global object and replicate S1 to the remote deployment 402 (e.g., using the command "alter share S1 enable replication to accounts Reg_2.B"). More specifically, at block 705 remote deployment 401 may modify S1, which is an object specific to region 1, to include a global representation that is present in region 2. Remote deployment 401 may set the authorization properties of S1 to store a list of global accounts that are enabled to create a local replica of S1 and include in the list account B. S1 may include an existing "primaryOn" field which is set to the timestamp of when account A alters S1 to be a global object and replicates S1 to the remote deployment 402. In order to identify S1 as a primary and distinguish it from any secondary replicas. Account B may obtain a list of share objects owned by him/herself or others in the same replication group for which access is enabled (e.g., using the command "show replication shares"), and the list may include an identifier for S1 ("Reg_1.A.S1 (primary)"). In some embodiments, S1 as well as any replica object created therefrom may be designated as the primary.

Because a global representation of S1 is present in region 2, at block 710, account B may then create a local replica of S1 (e.g., using the command "create share S1R as replica of Reg_1.A.S1 (primary)") which creates a global share object that is a replica of S1 (shown in FIG. 4 as S1R) with the "primaryOn" field set to "0" since it is a replica. A local replica of DB1 (DB1R) may be created on remote deployment 402 using the same process discussed hereinabove with respect to database replication, which creates DB1R as a global type database, because it was created as a replica of DB1 which has been made global. Account B may also obtain a list of databases for which access is enabled as discussed above. In some embodiments, account A may use a communication protocol such as SSH for example to establish a secure connection to account B via which account A may "remote login" to account B or start a remote execution context in account B to create the replica share object S1R and replica database DB1R. More specifically, a global identity may be created that is linked to (e.g., has access to) multiple accounts (in this case, account A and account B). Upon creation of this global identity, a user who logs into account A may establish the secure connection to account B via which account A may "remote login" to account B or start a remote execution context in account B. At this point, account A may initiate functions for creation of the replica share object S1R and replica database DB1R on remote deployment 401, and these functions may subsequently be executed in account B on remote deployment 402. S1R and DB1R may be replicated to any appropriate object, such as a dictionary object in the local metadata store (e.g., FoundationDB) of remote deployment 402.

It should be noted that at this point, no replication of share grants (e.g., the grant metadata) between S1 and the original database DB1 or the underlying data of the database DB1 (e.g., the underlying schemas, tables, views, functions, formats etc. of DB1) has occurred yet. To start replication of the share grants of S1, at block 715, account B may initiate replication of the underlying data of DB1 (e.g., the underlying schemas, tables, views, functions, formats etc. of DB1) to DB1R. At block 720, account B may initiate a share refresh operation (e.g., using the command "alter share S1R refresh"). The remote deployment 402 may send a refresh message (shown in FIG. 5 as "refresh S1R") to the remote deployment 401 which will replicate the necessary information to the remote deployment 402. More specifically, upon receipt of the refresh message, remote deployment 401 may replicate the grant metadata of S1 to S1R as discussed in further detail below with respect to FIG. 8. In some embodiments, the database replication process discussed above may be automatically triggered, to initiate replication of the underlying data of DB1 (e.g., the underlying schemas, tables, views, functions, formats etc. of DB1) to DB1R in response to the share refresh message (e.g., may be part of the share refresh operation). In some embodiments, the database replication process is separate from the share refresh operation and is not automatically triggered by the refresh message and may be triggered by the user at their discretion. For example, the owner of account B may choose to trigger a share refresh as a downstream task from the database replication. In some embodiments, account A may use any appropriate communication protocol to "remote login" to account B or start a remote execution context in account B as discussed herein, and trigger a refresh operation.

Figure 8:
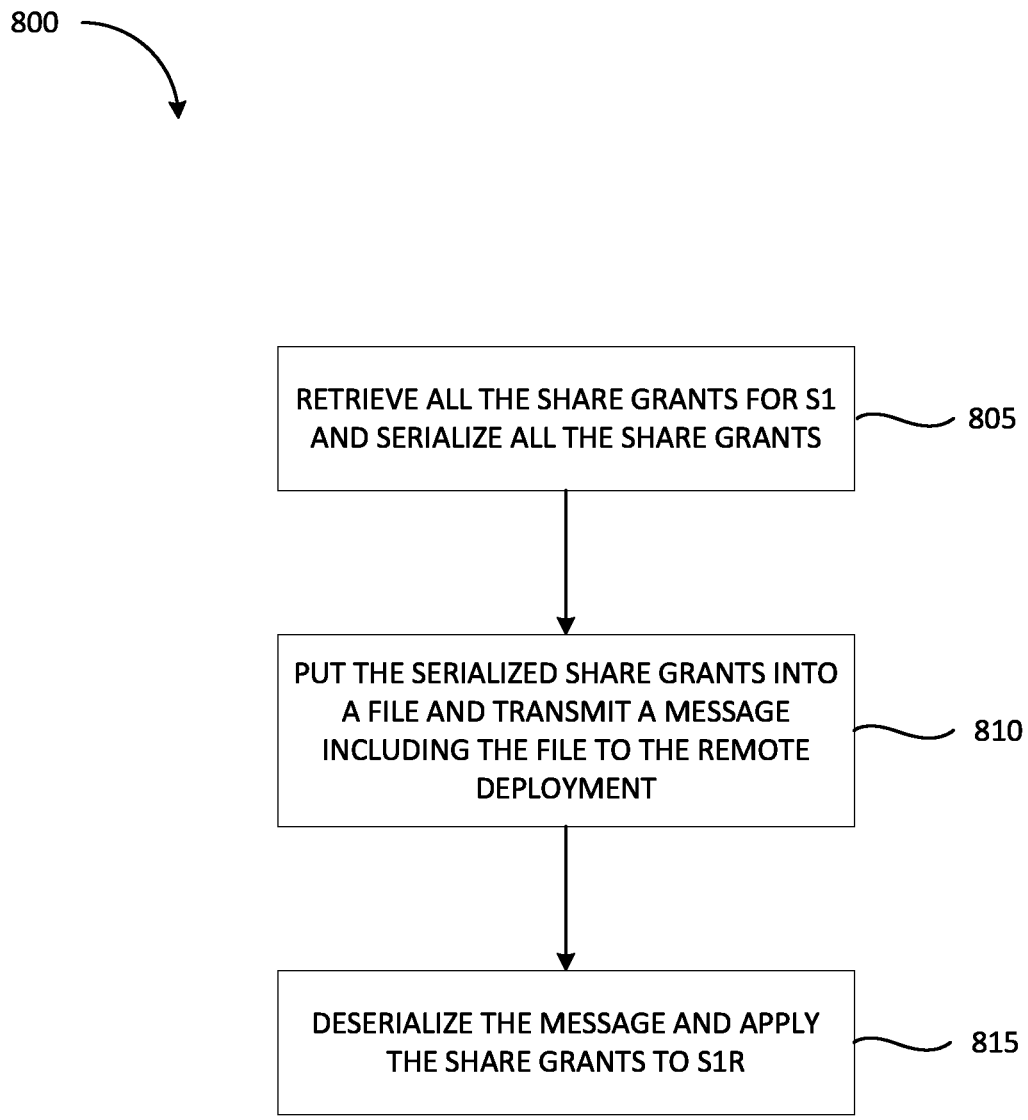
FIG. 8 is a flow diagram of a method for performing a share grant refresh operation, in accordance with some embodiments of the present invention.

FIG. 8 is a flow diagram of a method 800 of refreshing share grants to a share object in a remote deployment, in accordance with some embodiments of the present disclosure. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 800 may be performed by respective processing devices of remote deployments 401 and 402 (illustrated in FIGS. 4 and 5).

Referring also to FIG. 5, in response to receiving the refresh message ("refresh S1R") from remote deployment 402, at block 805 the remote deployment 401 may retrieve all the share grants for S1 and serialize all the share grants. At block 810, the remote deployment 401 may put the serialized share grants into a file and transmit a message including the file to the remote deployment 402. In some embodiments, the remote deployment 401 may leverage a global messaging framework and utilize a special message type (referred to herein as a "snapshot message") that specifically enables the share replication. For each global message type, there is a corresponding processing function that applies to processing messages of that type. Thus, a global message of a particular type will include custom logic for what processing needs to be done for that particular message type. The snapshot message type may include information to inform a deployment that the message includes grants and allow a remote deployment to properly deserialize the grants for the purposes of share replication. More specifically, the body of the message may comprise a global object reference for S1 and a list of modified grant objects representing the grants on DB1 and its underlying objects to S1. The global object reference may comprise a tuple of the original deployment ID (e.g., the ID of remote deployment 401) and the ID of the object to be replicated, which in this example is the ID of the share object S1. Each grant object may be an internal representation of a particular grant to S1 and may be associated to S1 to allow a consumer to use/select the underlying database objects defined by the grant. Each grant object may have several fields including: a global object reference of DB1 or one of its underlying objects that are granted to the share, an object type (e.g., securable type), a privilege/grant type (e.g., usage or select), and a timestamp of when the grant happened, for example.

At block 815, the remote deployment 402 may deserialize the message and apply the share grants to SlR. As can be seen, a share refresh as described herein is based on a pull model (as opposed to a push model). Stated differently, S1R will update only when a share refresh is requested and there will be a discrepancy between S1R and S1 until a share refresh of S1R is performed.

Figure 9:
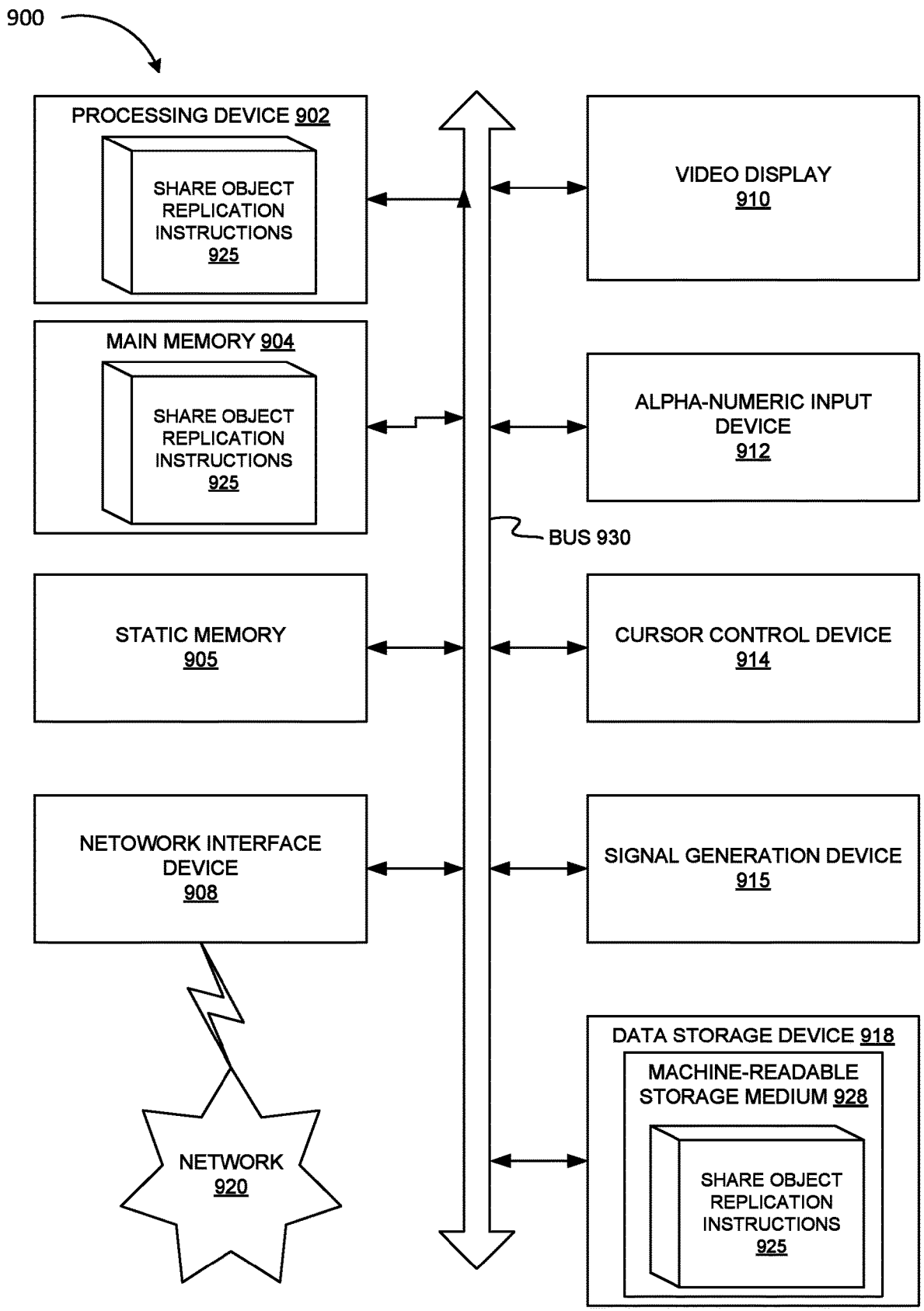
FIG. 9 is a block diagram of an example computing device that may perform one or more of the operations described herein, in accordance with some embodiments of the present invention.

FIG. 9 illustrates a diagrammatic representation of a machine in the example form of a computer system 900 within which a set of instructions, for causing the machine to perform any one or more of the methodologies discussed herein for replicating a share object to a remote deployment. More specifically, the machine may modify a share object of a first account into a global object wherein the share object includes grant metadata indicating share grants to a set of objects of a database. The machine may create, in a second account located in a remote deployment, a local replica of the share object on the remote deployment based on the global object and replicate the set of objects of the database to a local database replica on the remote deployment; and refresh the share grants to the local replica of the share object.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may be representative of a server.

The exemplary computer system 900 includes a processing device 902, a main memory 904 (e.g., read-only memory (ROM), flash memory, dynamic random access memory (DRAM), a static memory 906 (e.g., flash memory, static random access memory (SRAM), etc.), and a data storage device 918, which communicate with each other via a bus 930. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In one embodiment, video display unit 910, alphanumeric input device 912, and cursor control device 914 may be combined into a single component or device (e.g., an LCD touch screen).

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute function compilation instructions 925, for performing the operations and steps discussed herein.

The data storage device 918 may include a machine-readable storage medium 928, on which is stored one or more sets of share object replication instructions 925 (e.g., software) embodying any one or more of the methodologies of functions described herein. The share object replication instructions 925 may also reside, completely or at least partially, within the main memory 904 or within the processing device 902 during execution thereof by the computer system 900; the main memory 904 and the processing device 902 also constituting machine-readable storage media. The share object replication instructions 925 may further be transmitted or received over a network 920 via the network interface device 908.

The machine-readable storage medium 928 may also be used to store instructions to perform a method for determining functions to compile, as described herein. While the machine-readable storage medium 928 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "granting," "determining," "publishing," "providing," "designating," "encoding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
generating a global representation of a share object of a first account, the global representation located in a region associated with a second account, the first account residing in a first deployment and the second account residing in a second deployment remote from the first deployment;
creating, in the second account, a local replica of the share object based on the global representation of the share object, wherein the share object includes grant metadata associated with a set of objects of a database;
replicating the set of objects of the database to a local database replica on the second deployment; and
refreshing the grant metadata to the local replica of the share object.

2. The method of claim 1, further comprising:
performing a subsequent refresh of the grant metadata to the local replica of the share object; and
performing a subsequent replication of the set of objects of the database to the local database replica, wherein one or more of the grant metadata and the set of objects are modified.

3. The method of claim 2, wherein in response to determining that one or more of the set of objects are not present in the local database replica during the subsequent refresh:

refreshing grant metadata associated with objects that are present in the local database replica to the local replica of the share object; and creating a log file indicating:
   the one or more objects that are not present in the local database replica; and
   grant metadata associated with the one or more objects that are not present in the local database replica.

4. The method of claim 1, wherein refreshing the grant metadata to the local replica of the share object comprises:
   receiving a share refresh message;
   serializing the grant metadata of the share object;
   storing the serialized grant metadata into a snapshot message, wherein the snapshot message includes information to deserialize the serialized grant metadata; and
   transmitting the snapshot message to the second deployment.

5. The method of claim 4, wherein refreshing the grant metadata to the local replica of the share object further comprises:
   de-serializing the snapshot message based on the information to deserialize the serialized grant metadata; and
   applying the grant metadata to the local replica of the share object.

6. The method of claim 1, wherein the grant metadata indicates share grants to the set of objects of the database.

7. The method of claim 1, wherein creating the local replica comprises:
   establishing a secure connection between the first account and the second account; and
   establishing a remote execution context in the second account, wherein the first account may create the local replica in the second account using the remote execution context.

8. A system comprising:
   a memory; and
   a processor, operatively coupled to the memory, the processor to:
      generate a global representation of a share object of a first account, the global representation located in a region associated with a second account, the first account residing in a first deployment and the second account residing in a second deployment remote from the first deployment;
      create, in the second account, a local replica of the share object based on the global representation of the share object, wherein the share object includes grant metadata associated with a set of objects of a database;
      replicate the set of objects of the database to a local database replica on the second deployment; and
      refresh the grant metadata to the local replica of the share object.

9. The system of claim 8, wherein the processor is further to:
   perform a subsequent refresh of the grant metadata to the local replica of the share object; and
   perform a subsequent replication of the set of objects of the database to the local database replica, wherein one or more of the grant metadata and the set of objects are modified.

10. The system of claim 9, wherein in response to determining that one or more of the set of objects are not present in the local database replica during the subsequent refresh, the processor is to:
    refresh grant metadata associated with objects that are present in the local database replica to the local replica of the share object; and
    create a log file indicating:
       the one or more objects that are not present in the local database replica; and
       grant metadata associated with the one or more objects that are not present in the local database replica.

11. The system of claim 8, wherein to refresh the grant metadata to the local replica of the share object, the processor is to:
    receive a share refresh message;
    serialize the grant metadata of the share object;
    store the serialized grant metadata into a snapshot message, wherein the snapshot message includes information to deserialize the serialized grant metadata; and
    transmit the snapshot message to the second deployment.

12. The system of claim 11, wherein to refresh the grant metadata to the local replica of the share object, the processor is further to:
    de-serialize the snapshot message based on the information to deserialize the serialized grant metadata; and
    apply the grant metadata to the local replica of the share object.

13. The system of claim 8, wherein the grant metadata indicates share grants to the set of objects of the database.

14. The system of claim 8, wherein to create the local replica, the processor is to:
    establish a secure connection between the first account and the second account; and
    establish a remote execution context in the second account, wherein the first account may create the local replica in the second account using the remote execution context.

15. A non-transitory computer-readable medium having instructions stored thereon which, when executed by a processor causes the processor to:
    generate a global representation of a share object of a first account, the global representation located in a region associated with a second account, the first account residing in a first deployment and the second account residing in a second deployment remote from the first deployment;
    create, in the second account, a local replica of the share object based on the global representation of the share object, wherein the share object includes grant metadata associated with a set of objects of a database;
    replicate the set of objects of the database to a local database replica on the second deployment; and
    refresh the grant metadata to the local replica of the share object.

16. The non-transitory computer-readable medium of claim 15, wherein the processor is further to:
    perform a subsequent refresh of the grant metadata to the local replica of the share object; and
    perform a subsequent replication of the set of objects of the database to the local database replica, wherein one or more of the grant metadata and the set of objects are modified.

17. The non-transitory computer-readable medium of claim 16, wherein in response to determining that one or more of the set of objects are not present in the local database replica during the subsequent refresh, the processor is to:
    refresh grant metadata associated with objects that are present in the local database replica to the local replica of the share object; and create a log file indicating:
- the one or more objects that are not present in the local database replica; and
- grant metadata associated with the one or more objects that are not present in the local database replica.

18. The non-transitory computer-readable medium of claim 15, wherein to refresh the grant metadata to the local replica of the share object, the processor is to:
- receive a share refresh message;
- serialize the grant metadata of the share object;
- store the serialized grant metadata into a snapshot message, wherein the snapshot message includes information to deserialize the serialized grant metadata; and
- transmit the snapshot message to the second deployment.

19. The non-transitory computer-readable medium of claim 18, wherein to refresh the grant metadata to the local replica of the share object, the processor is further to:
- de-serialize the snapshot message based on the information to deserialize the serialized grant metadata; and
- apply the grant metadata to the local replica of the share object.

20. The non-transitory computer-readable medium of claim 15, wherein to create the local replica, the processor is to:
- establish a secure connection between the first account and the second account; and
- establish a remote execution context in the second account, wherein the first account may create the local replica in the second account using the remote execution context.

* * * * *